(12) United States Patent
Hobmaier et al.

(10) Patent No.: US 11,668,334 B2
(45) Date of Patent: Jun. 6, 2023

(54) BALL-LOCK CONNECTOR

(71) Applicant: ODU GmbH & Co. KG, Mühldorf a. Inn (DE)

(72) Inventors: Christian Hobmaier, Niedertaufkirchen (DE); Josef Weigand, Heldenstein (DE)

(73) Assignee: ODU GMBH & CO. KG, Muehldorf (DE)

( * ) Notice: Subject to any disclaimer, the term of this patent is extended or adjusted under 35 U.S.C. 154(b) by 322 days.

(21) Appl. No.: 17/012,249

(22) Filed: Sep. 4, 2020

(65) Prior Publication Data
US 2021/0071698 A1   Mar. 11, 2021

(30) Foreign Application Priority Data

Sep. 6, 2019 (EP) .................................... 19196036

(51) Int. Cl.
*F16B 7/04* (2006.01)
*G02B 6/38* (2006.01)
*H01R 13/627* (2006.01)
*F16L 37/23* (2006.01)

(52) U.S. Cl.
CPC ............ *F16B 7/042* (2013.01); *G02B 6/3893* (2013.01); *H01R 13/6276* (2013.01); *F16L 37/23* (2013.01)

(58) Field of Classification Search
CPC .... F16B 7/042; F16B 21/165; H01R 13/6276; F16L 37/23; F16L 37/32; F16L 37/36; F16L 37/44
See application file for complete search history.

(56) References Cited

U.S. PATENT DOCUMENTS

| | | | | | |
|---|---|---|---|---|---|
| 2,665,928 | A | * | 1/1954 | Omon | F16L 37/23 |
| | | | | | 137/614.04 |
| 3,567,175 | A | * | 3/1971 | Sciuto, Jr. | F16L 37/40 |
| | | | | | 251/149.6 |
| 3,715,099 | A | * | 2/1973 | Shendure | F16L 37/23 |
| | | | | | 251/149.6 |
| 4,014,467 | A | * | 3/1977 | Ferguson | F16L 37/23 |
| | | | | | 134/179 |

(Continued)

FOREIGN PATENT DOCUMENTS

| CN | 2729951 Y | 9/2005 |
|---|---|---|
| CN | 101656381 A | 2/2010 |

(Continued)

*Primary Examiner* — Daniel J Wiley
(74) *Attorney, Agent, or Firm* — WCF IP

(57) ABSTRACT

A connector has at least one engagement ball that is movable between an engagement position and a disengagement position. A movement of an engagement ball operating part of the connector relative to an inner housing of the connector can force the at least one engagement ball from the engagement position into the disengagement position. The at least one engagement ball is biased in the engagement position by an elastic element via the engagement ball operating part. The connector further comprises an outer housing of the connector with a catch that when the outer housing is operated engages with a counter catch of the engagement ball operating part to move the engagement ball operating part, so that the engagement ball operating part forces the at least one engagement ball from the engagement position into the disengagement position.

11 Claims, 5 Drawing Sheets

(56) References Cited

U.S. PATENT DOCUMENTS

| | | | | |
|---|---|---|---|---|
| 4,148,459 A * | 4/1979 | Martinez | F16L 37/23 | 251/149.6 |
| 4,198,080 A * | 4/1980 | Carpenter | F16L 37/23 | 403/325 |
| 4,213,482 A * | 7/1980 | Gondek | F16L 37/23 | 137/614.01 |
| 4,366,945 A * | 1/1983 | Blauenstein | F16L 37/22 | 251/149.6 |
| 4,645,372 A * | 2/1987 | Suzuki | F16D 1/116 | 403/322.2 |
| 4,859,110 A * | 8/1989 | Dommel | F16D 1/116 | 403/328 |
| 4,932,431 A | 6/1990 | Silagy | | |
| 4,957,387 A * | 9/1990 | Nasu | F16D 3/387 | 403/322.2 |
| 5,230,538 A * | 7/1993 | Kobayashi | F16L 37/23 | 285/321 |
| 5,290,009 A * | 3/1994 | Heilmann | F16L 37/23 | 251/149.6 |
| 5,366,313 A * | 11/1994 | LaBarre | E05C 17/30 | 403/322.2 |
| 5,445,358 A * | 8/1995 | Anderson | F16L 37/38 | 251/149.6 |
| 5,540,250 A * | 7/1996 | Mullins | F16L 37/42 | 251/149.6 |
| 6,279,874 B1 * | 8/2001 | Nyberg | F16L 37/121 | 251/149.6 |
| 6,511,100 B1 * | 1/2003 | Le Clinche | F16L 37/23 | 403/322.2 |
| 7,452,006 B2 * | 11/2008 | Kohda | F16L 37/23 | 285/308 |
| 7,841,580 B2 * | 11/2010 | Konishi | F16L 37/40 | 251/149.6 |
| 7,926,855 B2 * | 4/2011 | Kitagawa | F16L 37/23 | 285/277 |
| 7,938,456 B2 * | 5/2011 | Chambaud | F16L 37/42 | 285/85 |
| 8,056,581 B2 * | 11/2011 | Danielson | F16L 37/44 | 251/149.6 |
| 8,469,406 B2 * | 6/2013 | Takahashi | F16L 37/34 | 137/614.05 |
| 8,764,473 B2 | 7/2014 | Komatsubara | | |
| 8,844,942 B1 | 9/2014 | Landowski et al. | | |
| 9,242,422 B2 | 1/2016 | Schweizer et al. | | |
| 9,500,310 B2 * | 11/2016 | White | F16L 37/22 | |
| 9,502,822 B1 | 11/2016 | Huang | | |
| 9,752,713 B2 * | 9/2017 | Tiberghien | F16L 37/42 | |
| 10,989,343 B2 * | 4/2021 | Madocks | F16L 37/23 | |
| 2003/0129873 A1 | 7/2003 | Heebe et al. | | |
| 2007/0087612 A1 * | 4/2007 | Tsujita | F16B 21/165 | 439/346 |
| 2012/0243932 A1 | 9/2012 | McCann | | |

FOREIGN PATENT DOCUMENTS

| | | |
|---|---|---|
| CN | 102856723 A | 1/2013 |
| CN | 108254835 A | 7/2018 |
| DE | 10 2016 105 975 A1 | 10/2017 |
| EP | 0184799 A2 | 6/1986 |
| FR | 1384065 A | 1/1965 |
| FR | 2527741 A1 | 12/1983 |
| JP | H0992295 A | 4/1997 |
| JP | H09329285 A | 12/1997 |
| RU | 2487782 C2 | 7/2013 |

* cited by examiner

BALL-LOCK CONNECTOR

FIELD OF THE INVENTION

The invention relates to a connector comprising at least one engagement ball that is movable between an engagement position and a disengagement position. The invention moreover relates to a system comprising the connector and a counter connector. Further, the invention relates to a method of unlocking a connector from a counter connector.

BACKGROUND OF THE INVENTION

The invention generally concerns the art of ball-lock connectors. A connector of this type can be locked to a counter connector by means of a ball-lock. In a typical ball-lock, a group of balls is positioned in holes located around the inner diameter of the connector. A spring-loaded sleeve around the connector's outer diameter forces the balls toward the connector's inner diameter. To connect the connector, the sleeve is pushed back, which opens a clearance so the balls are free to move outward. Once the connector is in place, releasing the sleeve forces the balls inward against a locking groove on the outer diameter of the counter connector. To disconnect, pushing the sleeve back provides the balls with clearance to move outward and allow the connector to be removed from the counter connector.

U.S. Pat. No. 8,764,473 B2 discloses a connector comprising a tubular member with ball storage holes therein, and engagement balls contained in the ball storage holes. An inner sleeve and an outer sleeve are disposed on the outside of the tubular member so as to move in the axial direction. When a counterpart connector is attached to the connector, each engagement ball moves from a first position wherein a part of the engagement ball is projected from the inner peripheral surface of the tubular member to a second position which is close to a first inner peripheral surface of an outer sleeve, wherein a part of the engagement ball is not projected from the inner peripheral surface. Thereafter, the engagement balls return to the first position. When the counterpart connector is detached, each engagement ball moves from the first position to a third position which is close to a second inner peripheral surface of the outer sleeve, wherein a part of the engagement ball is not projected from the inner peripheral surface, and thereafter, returns to the first position.

From CN 101656381 A a radio frequency connector is known that comprises a retaining ring holding locking steel balls. An outer side of the balls contacts a sheath tensioned by a small spring, and an inner side contacts a tapered ring tensioned by a large spring. When the connector is introduced into a matching socket, a front end of the socket moves the sheath against the force of a small spring and the steel balls are moved by the force of the large spring through the tapered ring into a position in which they engage with a corresponding part of the socket. To release the connector from the socket, a nut of the connector can be operated to return the tapered ring in the original position against the force of the large spring. As a result, the locking steel balls can return into their previous position. A pipe coupling with a similar mode of operation is known from FR 248 4053 A2.

DE 10 2016 105 975 A1 describes a locking device which comprises a first locking means and a second locking means which can be joined with one another. Blocking balls are provided for engaging the first locking means with the second locking means. They can be moved by means of an actuator. Another actuator is arranged in the first locking means or in the second locking means to protect against failure of the locking device. The first locking means and the second locking means are provided for use in a plug and a corresponding counter plug.

Other ball-lock connectors, ball-lock pipe couplings and other ball-lock couplings are known from CN 2729951 Y, CN 102856723 A an CN 108254835 A, FR 1384065 A, FR 2527741 B1, EP 0184799 A2, US 20120243932 A1 and U.S. Pat. No. 9,242,422 B2.

OBJECT OF THE INVENTION

It is an object of the present invention to provide an improved connector that comprises at least one engagement ball that is movable between an engagement position and a disengagement position. The invention moreover aims at providing an improved system that comprises the connector and a counter connector. Further, the invention seeks to provide an improved method of unlocking a connector from a counter connector.

Solution According to the Invention

The reference numerals in the patent claims are not meant to be limiting but merely serve to improve readability of the claims.

In one aspect of the invention, the problem is solved by a connector with the features of claim 1. The connector comprising at least one engagement ball that is movable between an engagement position and a disengagement position. A motion of an engagement ball operating part of the connector relatively to an inner housing of the connector can force the at least one engagement ball from the engagement position into the disengagement position.

It is an achievable advantage of this embodiment of the invention that the lock is particularly reliable even if the connector and a counter connector, to which the connector is locked, are pulled apart from each other with great force or the connector and the counter connector are exposed to strong vibrations.

In the context of the present invention, an "engagement position" is a position in which the at least one locking ball extends into an engagement space in which it is accessible for an engagement part of a counter connector so that the engagement ball of the connector and the engagement part of the counter connector can engage with each other to effect locking of the connector to the counter connector. Accordingly, the "disengagement position" is a position in which the at least one locking ball is withdrawn from the engagement space so that the engagement ball of the connector and the engagement part of the counter connector do no longer engage with each other, thus effecting the connector to be released from the counter connector.

In the context of the present invention, the adjective "inner" in "inner housing" merely serves to distinguish this housing from another, optional "outer" housing. Yet, the presence of the inner housing does not necessarily require the existence of the outer housing or any other further housing. Also, the adjective "inner" in "inner housing" does not necessarily require that there exist parts of the connector that are in any way outside the inner housing. However, a preferred connector according to the invention comprises both an inner housing and an outer housing, and, preferably, the outer housing is outside the inner housing in the sense that it at least partially encloses the inner housing.

In the context of the present invention, that the motion of the engagement ball operating part "forces" the engagement ball from the engagement position into the disengagement position means that it applies a force directly to the engagement ball, which force moves the engagement ball from the engagement position to the disengagement position. Accordingly, the force applied by the engagement ball operating part to the engagement ball has at least one component—in the sense of a parallelogram of forces—that extends in the direction from the engagement position to the disengagement position of the engagement ball. This is in contrast to the situation for example in U.S. Pat. No. 8,764,473 B2 and DE 102016105975 A1, where it is a part of the counter-connector that forces the engagement ball from the engagement position into the disengagement position.

Preferably, the engagement ball operating part forces the engagement ball from the engagement position into the disengagement position by means of moving from a locking position into the unlocking position.

The present invention encompasses embodiments in which the outer housing and the engagement ball operating part are separate parts, and embodiments, in which they are a single part that servers both as the outer housing and the engagement ball operating part.

The engagement ball within the meaning of the present invention must not necessarily be spherical or essentially spherical but can also deviate from a spherical shape toward an ellipsoidal, cylindrical, ovoid, cuboid or pill shape. Yet, the preferred engagement ball is essentially spherical.

In a further aspect of the invention, the problem is solved by a connector with the features of claim 12. The connector comprises an inner housing, at least one engagement ball, an engagement ball operating part that can move the at least one engagement ball between an engagement position and a disengagement position, and a supporting part which is rigidly connected with an inner housing and on which the at least one engagement ball at least partially rests in the engagement position. The engagement ball operating part comprises claws that extend through at least one window in the supporting part or the inner housing or between the supporting part and the inner housing.

This aspect of the invention allows the connector to be advantageously compact. In particular, the diameter of the connector can be reduced. It is also achievable that the length of the connector is reduced.

In another aspect of the invention, the problem is solved by a system according to claim 13. The system comprises the connector as described above and a counter connector that can be locked to the connector by means of the at least one engagement ball of the connector that engages with an engagement part of the counter connect.

When the connector is locked to the counter connector this means that it is prevented by the engagement of the engagement ball with the engagement part from being removed from the counter connector. Conversely, when the engagement ball does not engage with the engagement part, removal of the connector from the counter connector is no longer hindered by any cooperation of the engagement ball with the engagement part.

In yet another aspect of the invention, the problem is solved by means of a system comprising a connector and a counter connector that can be locked to the connector by means of a locking mechanism with at least one engagement ball of the connector that can be moved relatively to an inner housing of the connector from a disengagement position into an engagement position. In the engagement position, the at least one engagement ball engages with an engagement part of the counter connector in order to lock the connector to the counter connector. If the at least one engagement ball is in the engagement position and the locking mechanism is loaded, the at least one engagement ball does not, as a result of the force exerted on the engagement ball by the engagement part, exert a force on a part of the connector that is movable relatively to the inner housing and retains the engagement ball in the engagement position.

It is an achievable advantage of this aspect of the invention that the lock is particularly reliable even if the locking mechanism is loaded with large forces or the system is exposed to strong vibrations.

In the context of the present invention, the locking mechanism is loaded means that in a situation where the connector is locked to the counter connector my means of the engagement of the at least one engagement ball of the connector with the engagement part of the counter connector, the connector and the counter connector are pulled apart from each other in a direction opposite to the mating direction.

In yet another aspect of the invention, the problem is solved by the method of unlocking a connector from a counter connector according to claim 16. An engagement ball of the connector moves from a locking position, in which the engagement ball is engaged with an engagement part of the counter connector to lock the connector to the counter connector, to an unlocking position, in which the engagement ball is no longer engaged with the engagement part of the counter connector.

A connector according to the invention can serve to attach a cable to an apparatus. For this purpose, the connector can be attached to the cable; counter connector can be arranged on the apparatus, for example on a front panel of the apparatus. Yet, the invention also includes embodiments in which the connector is arranged on the apparatus; in such embodiments, the counter connector can be attached to the cable. In other embodiments, both, the connector and the counter connector are attached to cables, or both are arranged on apparatus.

With the invention it can advantageously be avoided that a part of the counter connector, in particular the engagement part, plays a role in moving the engagement ball from the engagement position to the disengagement position. As a result, it is achievable that the connector, the system and the method according to the invention is particularly resistant to vibration and shock. It can also be achieved that it is particularly suitable for be pre-stressed connectors, i.e. for connectors in which when the connector is locked to the counter connector, an force, typically provided by an elastic pre-stressing element, is present that biases the connector and the counter connector apart from each, thus keeping the locking mechanism under the tension of this force. Such pre-stressed connectors are for example used to establish a reliable contact between optical fibres.

PREFERRED EMBODIMENTS OF THE INVENTION

Preferred features of the invention which may be applied alone or in combination are discussed in the following and in the dependent claims.

The preferred connector comprising at least one engagement ball that is movable between an engagement position and a disengagement position, wherein a motion of an engagement ball operating part of the connector can force the at least one engagement ball from the engagement position into the disengagement position.

A preferred connector comprises an inner housing and outer housing which is movable relatively to the inner housing in a longitudinal direction of the connector. Preferably, the outer housing is operatively connected with the engagement ball operating part such that when the outer housing is moved relatively to the inner housing, it moves the engagement ball operating part to force the at least one engagement ball from the engagement position into the disengagement position. In other words (a) the outer housing is moved, typically by an operator, relatively to the inner housing (b) the outer housing moves an engagement ball operating part, and (c) the engagement ball operating part forces the engagement ball from the locking position into the unlocking position. It is an achievable advantage of this embodiment of the invention that the disengaging of the engagement ball can be effected from an easily accessible part of the connector, namely the outer housing; this can allow for a simple and intuitive operation of the connector.

Preferably, the outer housing can move between a distal position and a proximal position. Preferably, when the outer housing is moved into the proximal position, it moves the engagement ball operating part with it to force the at least one engagement ball from the engagement position into the disengagement position. It is an achievable advantage of this embodiment of the invention that a pulling of the outer housing in the proximal direction can effect a disengagement of the engagement ball and thus an unlocking of the connector from the counter connector. This can allow for a simple and intuitive operation of the connector.

In the context of the present invention, the distal position of the outer housing is the position closest to the distal end of the connector. The connector's distal end is the end that is intended to face the counter connector for mating the connector with the counter connector. Accordingly, the proximal position of the outer housing is the position closest to the proximal end of the connector. The connector's proximal end is the end that is opposite of its distal end. The distal direction is the direction that extends along the longitudinal axis of the connector and points towards the distal end of the connector. Conversely, the proximal direction is the direction towards the proximal end of the connector.

In a preferred connector, the motion of the engagement ball operating part is in the longitudinal direction of the connector. Preferably, the engagement ball operating part can move between a distal position and a proximal position. Preferably, the distal position of the engagement ball operating part is the locking position while the proximal position is the unlocking position. This embodiment of the invention allows for a particularly simple construction of the operational connection between the outer housing and the engagement ball operating part, for example by means of a catch and a counter catch as is explained further below in more detail.

As in the case of the outer housing, the distal position of the engagement ball operating part is the position closest to the distal end of the connector, and the proximal position of the engagement ball operating part is the position closest to the proximal end of the connector.

Preferably, when the engagement ball in the engagement position, it extends into a space which is suitable for an engagement part of a counter connector to be located to engage with the engagement ball in order to secure the connector to the counter connector. Typically, this is a cylindrical space that extends from the distal end of the connector some distance into the connector. Preferably, in this space a cylindrical part of the counter connector that comprises the engagement part can enter. The engagement part may for example be part of a ring shaped groove or one or more recesses in the cylindrical part.

The motion of the at least one engagement ball between the engagement position and the disengagement position preferably has a component in a radial direction of the connector. More preferably, the engagement position of the at least one engagement ball is closer to the longitudinal axis of the connector than the disengagement position. This way, for engagement with a counter connector, it can engage with an engagement part of the counter connector that faces the outside of the counter connector.

In a preferred connector, the at least one engagement ball is biased, directly or indirectly, in the engagement position by means of an elastic element. The elastic element preferably is a spring such as a helical spring or a leaf spring, or a body of an elastic material, for example a synthetic or natural rubber material. A particularly preferred spring is a wave spring, for example a Crest-to-Crest (R) wave spring as available from Smalley Steel Ring Co, 555 Oakwood Rd, Lake Zurich, Ill. 60047, USA. Advantageously, with the elastic element the at least one engagement ball can be forced against the biasing force of the elastic element from the engagement position into the disengagement position.

In a preferred embodiment of the invention, the at least one engagement ball is biased in the engagement position by means of the elastic element via the engagement ball operating part. Preferably, the elastic element exerts a force on the engagement ball operating part, at least a component of this force being directed in the distal direction of the connector. As a result, the elastic element can bias the engagement ball operating part in its distal position.

The preferred engagement ball operating part is a ball cage. The preferred ball cage comprises apertures in which the ball(s) is/are held. As a result, the engagement ball operating part cannot only—preferably by virtue of the elastic element that act on the engagement ball operating part—bias the at least one engagement ball in the engagement position, but can also, when operated, move the at least one engagement ball from the engagement position into the disengagement position.

The preferred engagement ball operating part is essentially ring shaped. The apertures preferably are tapered or stepped to reduce their diameter towards one side of the engagement ball operating part, in order to prevent the engagement balls from falling into the space vacated by the counter connector when the connector is separated from the counter connector. The preferred engagement ball operating part is provided with at least one claw that preferably extends from the ring shaped ball cage towards the elastic element to contact the elastic element. Preferably, the engagement ball operating part has more than one, for example 2, 3, 4, 5 or more claws. Each claw may hold 1 or more than one ball, for example 2 or 3 balls.

In a preferred connector the at least one engagement ball at least in the engagement position, preferably also in the disengagement position, rests on the surface of a supporting part, which surface is tapered along its extension in the longitudinal direction of the connector. Preferably, when moving back and forth between the engagement position and the disengagement position, the at least one engagement ball can roll or slide along the tapered surface of the supporting part. As a result, advantageously, the longitudinal motion of the at least one engagement ball operating part can be translated into a partially radial motion of the at least one engagement ball. The preferred supporting part is rigidly with the inner housing so that it cannot move in the longitudinal direction, particular preferably it is rigidly connected with the inner housing.

In a preferred embodiment of the invention, at least one window is provided in the supporting part or the inner housing or between the supporting part and the inner housing. Preferably, the engagement ball operating part comprises claws that extend through at least one window. As a result, it is achievable that the ball cage of the engagement ball operating part is located between the inner housing and the supporting part, and that the elastic element that biases the at least one engagement ball, directly or indirectly, in the engagement position is located on the same side, preferably outside, with regard to the radial direction of both the inner housing and the supporting part. This embodiment of the invention allows the connector to be advantageously compact. In particular, the diameter of the connector can be reduced. It is also achievable that the length of the connector is reduced.

The preferred supporting part comprises at least one claw. The at least one extends from a ring that comprises the surface on which the at least one engagement ball rests. At the at least one claw, the supporting part is attached to the inner housing. Alternatively, the inner housing and the supporting part with the at least one claw can be formed in one piece. Preferably, the supporting part has more than one, for example 2, 3, 4, 5 or more claws. The preferred claws mesh with the claws of the engagement ball supporting part. This can provide for a particularly slim design of the connector.

The outer housing preferably comprises a catch that when the outer housing is operated can engage with a counter catch of the engagement ball operating part to move the engagement ball operating part, preferably against the force of the elastic element, so that engagement ball operating part force the at least one engagement ball from the engagement position into the disengagement position. For this, preferably, the outer housing moves the engagement ball operating part from its locking position into the unlocking position.

The catch of the outer housing and the counter catch of the engagement ball operating part preferably are shaped and arranged in a way that when the engagement ball operating part is moved from its position in which the engagement ball is in its engagement position to its position in which the engagement ball is in its disengagement position, this motion of the engagement ball operating part is not translated into motion of the outer housing. As a result, advantageously, when joining the connector with the counter connector, the connector can be gripped at the outer housing of the connector without impeding the engagement and locking mechanism.

The preferred connector comprises at least two engagement balls, for example 2, 3, 4, 5, 6, 8, 9 or 10 engagement balls. It may also comprise more than 10 engagement balls.

The preferred connector can be locked to a counter connector by means of a locking mechanism with at least one engagement ball of the connector that can be moved relatively to an inner housing of the connector from a disengagement position into an engagement position. Preferably, in the engagement position the at least one engagement ball engages with an engagement part of the counter connector. If the at least one engagement ball is in the engagement position and the locking mechanism is loaded, the at least one engagement ball preferably does not exert a force on a part of the connector that is movable relatively to the inner housing and retains the engagement ball in the engagement position. More preferably, if does not exert a force on any part of the connector that is movable relatively to the inner housing. Particularly preferably, it does not exert a force on the engagement ball operating part. More preferably, it exerts a force only on the surface of the supporting part.

Preferably, when the connector is locked to the counter connector, the at least one supporting part of the connector holds the engagement ball in a locking position against forces applied to the at least one engagement ball by the counter connector. Preferably, when the connector is locked to the counter connector, a channel is provide between the at least one supporting part of the connector and the engagement part of the counter connector, and an engagement ball operating part can force the at least one engagement ball along the channel from the engagement position into the disengagement position. Thereby, advantageously, the engagement ball can be moved from the engagement position to the disengagement position without any contribution from the counter connector, in particular its engagement part. As a result, it is achievable that the connector, the system and the method according to the invention is particularly resistant to vibration and shock and is particularly suitable for be pre-stressed connectors.

The preferred connector is an electrical connector with a contact face that has one or more electrical contact elements, for example one or more contact pins or sockets. In addition or alternatively, the connector is an optical and/or fluid connector with a contact face that has one or more optical and/or fluid contact elements. The preferred connector is formed such that it can be attached to a cable that leads into to connector and comprises electrical, optical and/or fluid conduits that are connected to the electrical, optical and/or fluid contact elements. The preferred inner housing is rigidly attached to the contact elements and/or the conduits.

BRIEF DESCRIPTION OF THE DRAWINGS

In the following, further preferred embodiments of invention are illustrated by means of examples. The invention is not limited to these examples, however.

The drawings schematically show.

DETAILED DESCRIPTION OF AN EMBODIMENT OF THE INVENTION

Figure 1:
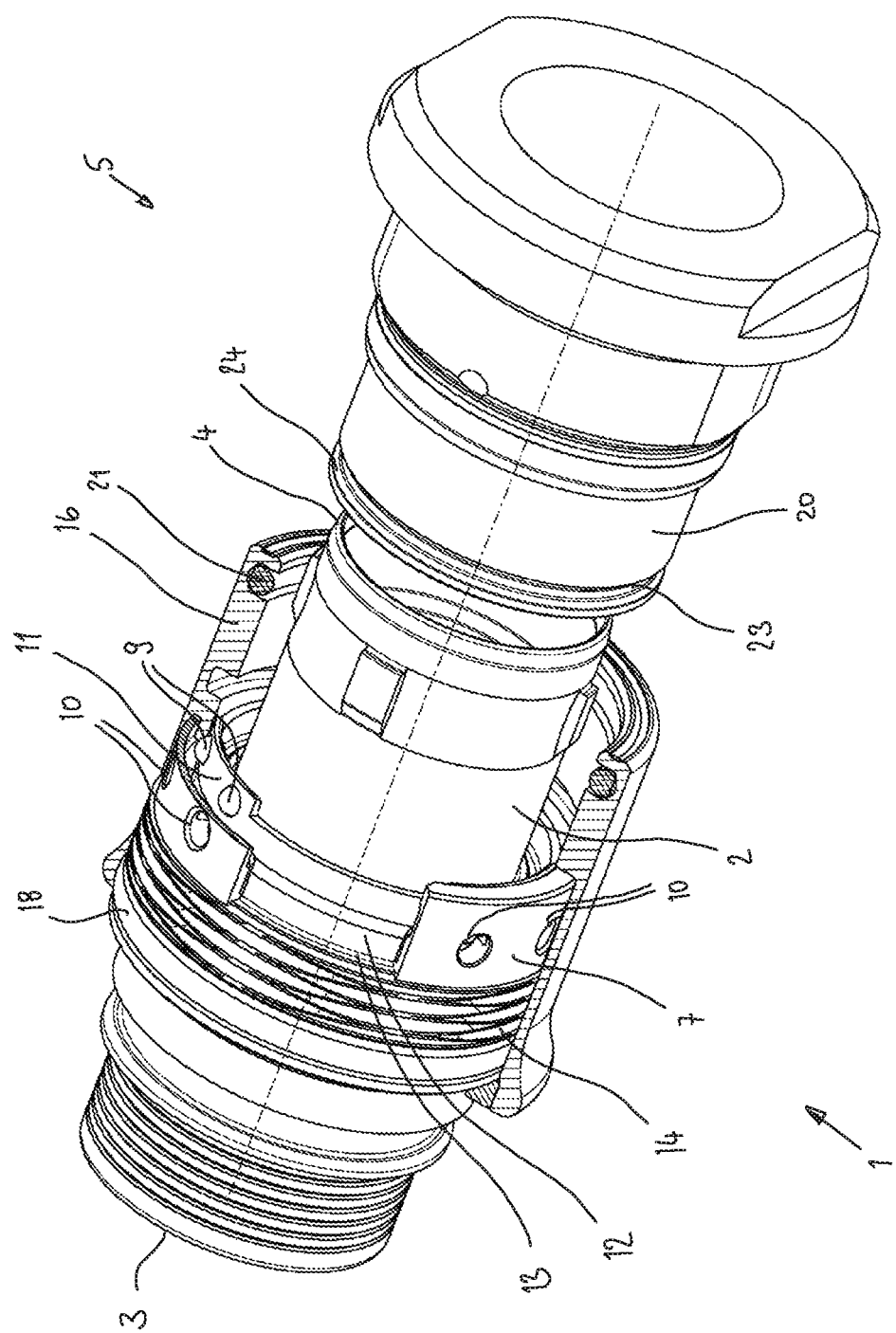
FIG. 1 A perspective cutaway drawing of a connector and a counter connector according to the invention.

In the following description of preferred embodiments of the invention, identical reference numerals refer to identical or similar components.

The connector 1 shown in FIGS. 1 to 5 comprises an inner housing 2 that extends from the proximal end 3 to the distal end 4 of the connector 1. Typically, at the proximal end 3, a cable (not shown) is introduced into the inner housing 2, and at the distal end 3, a connector face (not shown) is provided to mate with a corresponding connector face of the counter connector 5. Onto the inner housing 2, a claw ring 6 is rigidly mounted. As can be seen best in FIGS. 4 and 5, the claw ring 6 comprises three claws 7 that extend towards the distal end 3 of the connector 1, are equally spaced at angles of 120° relatively to each other and each span approximately 60°. At the distal ends of each claw 7, its inside is tapered towards the longitudinal axis of the connector 1, thereby forming a supporting part 8 for two engagement balls 9. In each claw 7 there are provided two apertures 10, through which the engagements balls 9 can be introduced from the outside to the inner side of the claw 7 during the assembly of the connector 1.

Figure 4:
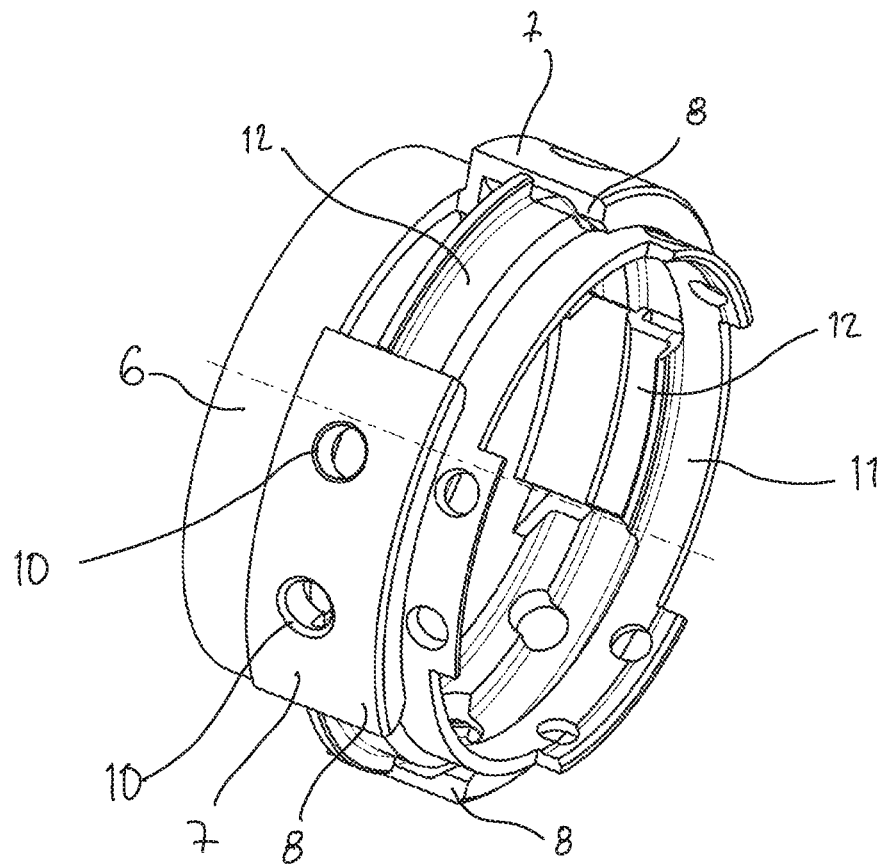
FIG. 4 A perspective cutaway drawing of the claw ring and the engagement ball operating part.
Figure 5:
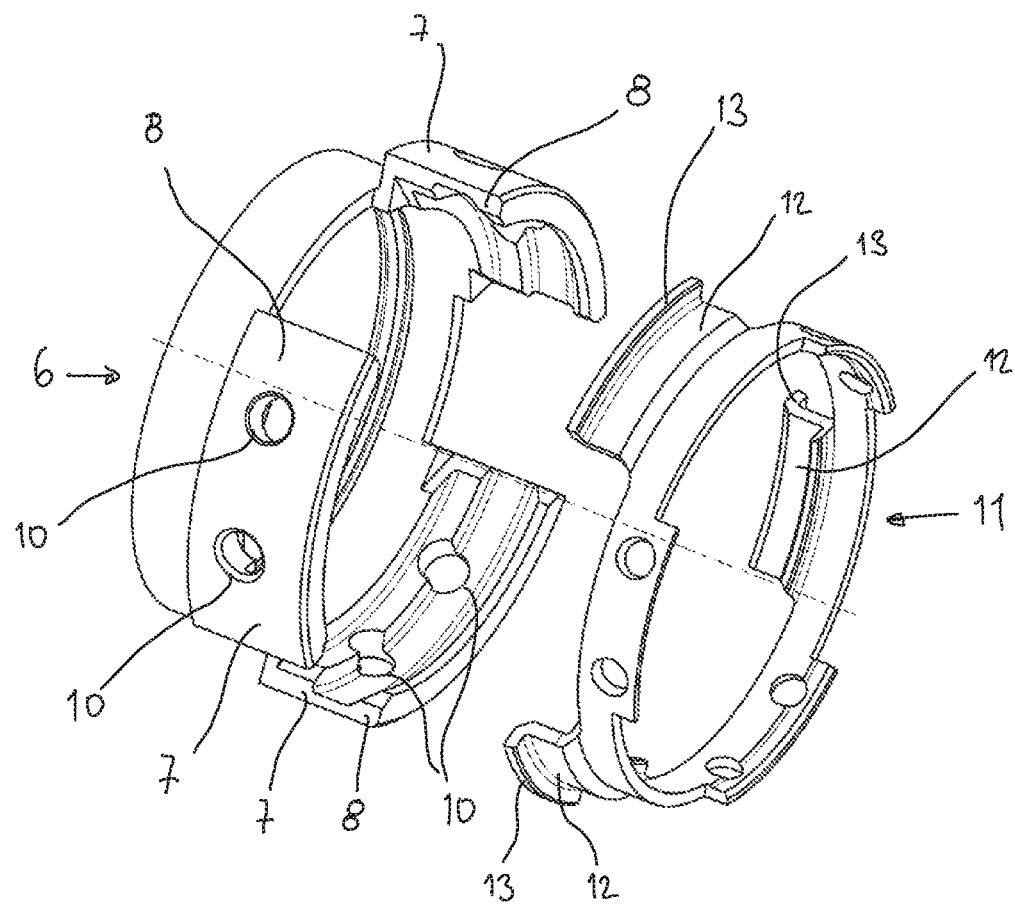
FIG. 5 A perspective cutaway explosion drawing of the claw ring and the engagement ball operating part.

The engagement balls 9 are held in an engagement ball operating part 11 in the form of a ring shaped ball cage. The ball cage comprises six apertures to hold the six balls 9. Through the apertures, the balls 9 can extend a certain distance into the space between the ball cage and the inner housing 2. The apertures are inwardly tapered towards the inside of the ball cage, in order to prevent the engagement balls 9 from falling into the space between the ball cage and the inner housing. The engagement ball operating part 11 moreover comprises claws 12 that extend towards the proximal end 3 of the connector 1 between the claws 7 of the claw ring as shown in FIG. 4. At the proximal end of each claw 12, a stop 13 is provided that is pressed against in the distal direction by a pre-tensioned wave spring 14. The wave spring 14 sits on a ring-shaped protrusion 15 of the inner housing 2 of the connector 1.

The engagement ball operating part 11 can be slid along the longitudinal axis of the connector 1 against the force of the wave spring 14 from a distal position, which is the engagement ball operating part's 11 resting position and is also referred to as the locking position, towards a proximal position, also referred to as the unlocking position. In the distal position, the tapered surfaces of the supporting parts 8 of the claws 7 of the claw ring 6 press the engagement balls 9 inwardly into apertures of the engagement ball operating part 11 so that they maximally extend into the space between the ball cage and the inner housing 2. This is also referred to as the engagement position of the engagement balls. When the engagement ball operating part 11 slides towards its proximal position, the wave spring 14 gives way and the claws 12 of the engagement ball operating part 11 pass over the ring part of the claw ring 6. At the same time, as the engagement balls 9 move in proximal direction relatively to the claws 7 of the claw ring 6, they become free to also move radially in the outside direction away from the apertures.

An outer housing 16 of the connector 1 is slidably mounted, via a press ring 17 of the outer housing 16, on the inner housing 2 of the connector 1. A first seal ring 18 seals the outer housing 16 against the inner housing 2. On the inside of the outer housing 16, a catch 19 is provided that can engage with a counter catch of the engagement ball operating part 11. As a result, when the outer housing 16 is slid from it distal position to its proximal position, the engagement ball operating part 11 likewise is slid from its distal position to its proximal position. Conversely, when the engagement ball operating part 11 is slid, by the force of the wave spring, from its proximal position to its distal position, the outer housing 16 likewise is slid from its proximal position to its distal position.

Figure 2:
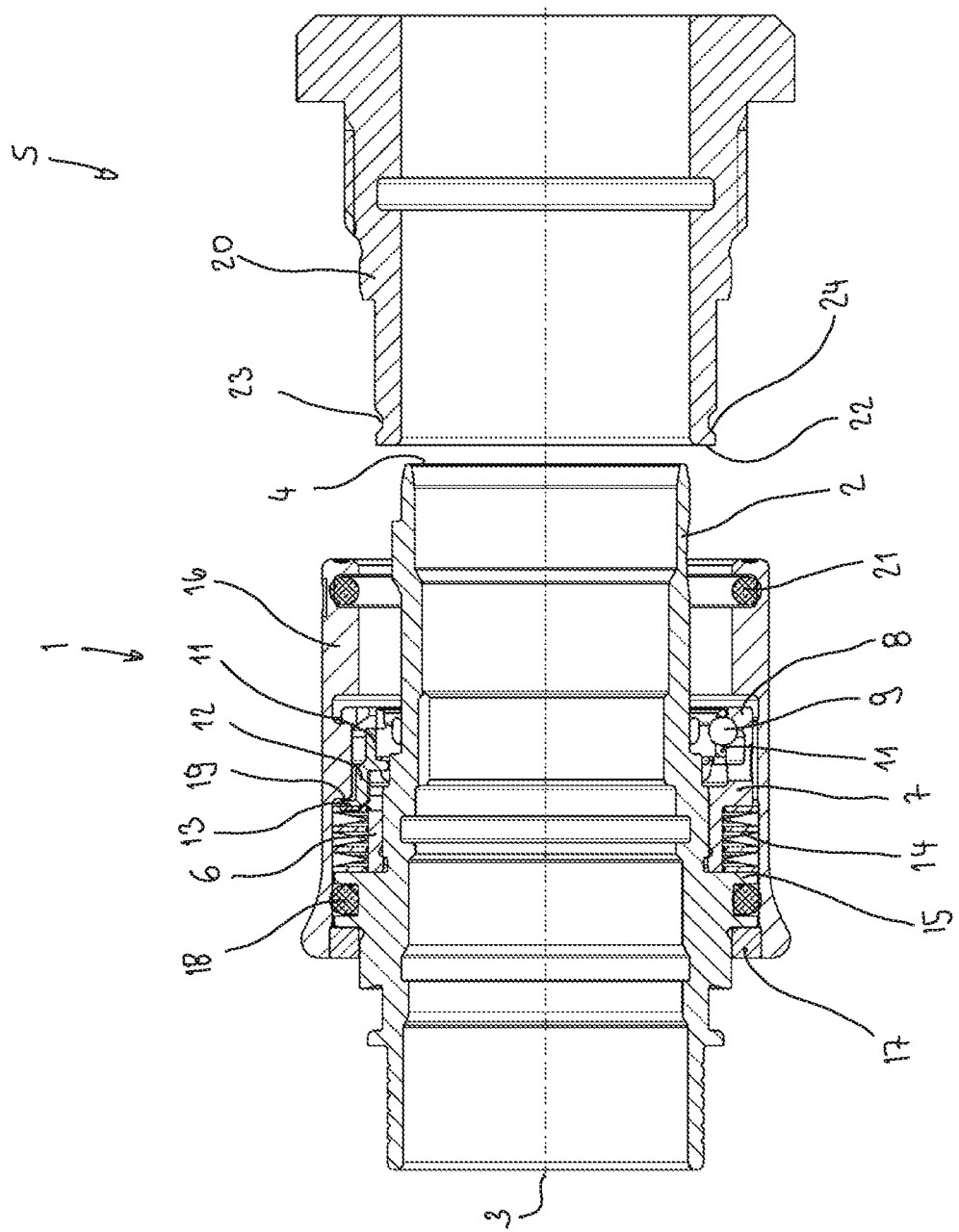
FIG. 2 A cross-sectional cutaway drawing of the connector and the counter connector of FIG. 1 with the engagement balls in the engagement position.
Figure 3:
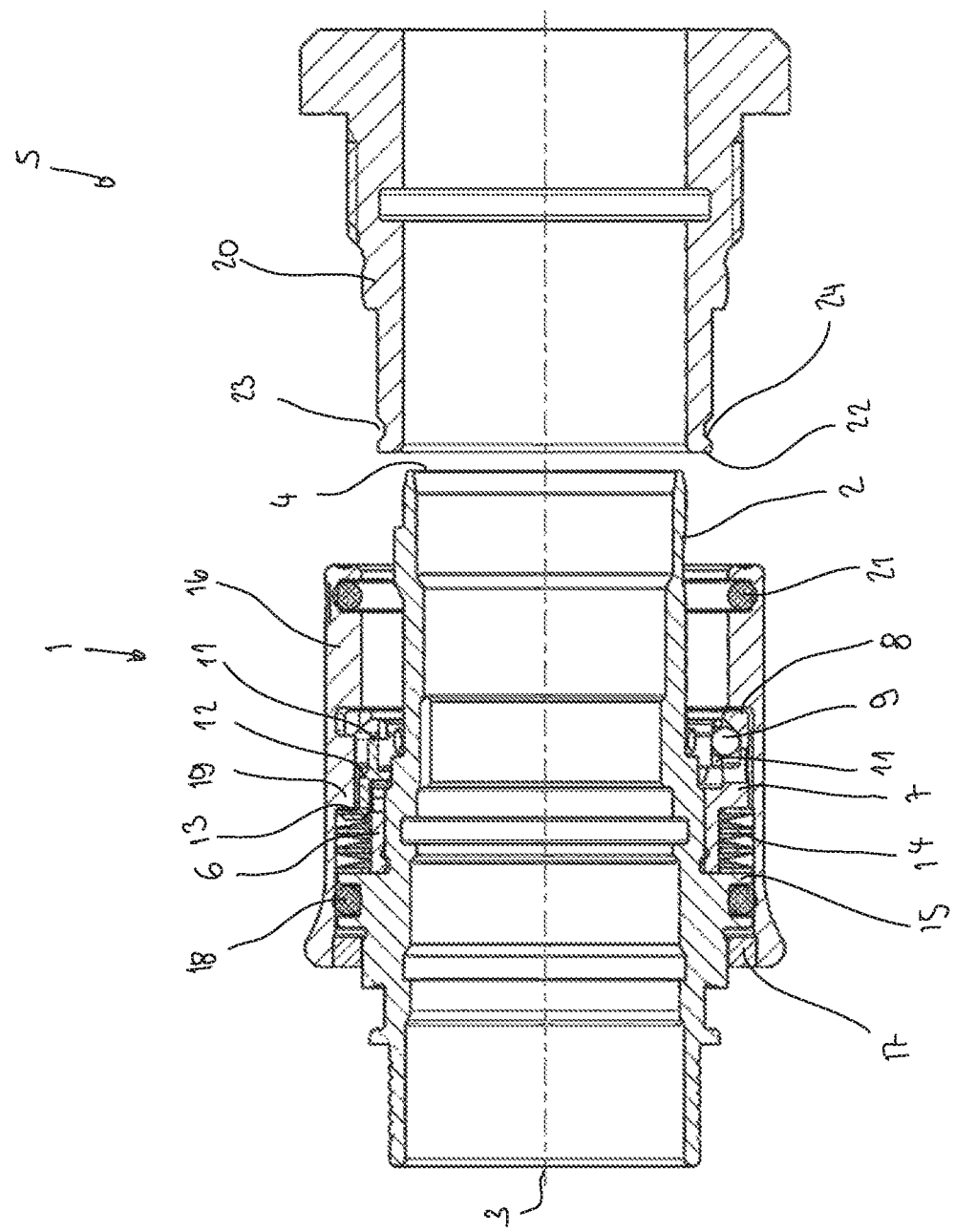
FIG. 3 A cross-sectional cutaway drawing of the connector and the counter connector of FIG. 1 with the engagement balls in the disengagement position.

FIGS. 1 and 2 show the connector 1 in its resting configuration, disconnected from the counter connector 5. In order to attach and lock the connector 1 to the counter connector 5, the inner housing 2 of the connector 1 is slid into the housing 20 of the counter connector 5 past a second rubber seal ring 21. For this, the operator can grip the connector 1 at its outer housing 16 or, if preferred, at any other part such as the exposed part of the inner housing 2 or the cable. As the inner housing 2 of the connector 1 is slid into the housing 20 of the counter connector 5, the latter enters into the space between the ball cage and the inner housing 2. The leading edge 22 of the housing 20 of the counter connector 5 presses on the parts of the engagement balls 9 that extend into the space between the ball cage and the inner housing 2, and the engagement balls 9 yield by sliding or rolling outwardly along the tapered surface of the supporting part 8, at the same time moving the engagement ball operating part 11 in the proximal direction against the force of the wave spring 14. FIG. 3 shows the engagement balls (9) and the engagement ball operating part (11) in this position. This does not affect the outer housing 16 of the connector 2, which can remain in its distal position. Subsequently, the leading edge 22 of the housing 20 of the counter connector 5 passes the engagement balls 9, and as an annular groove 23 on the outside of the housing 20 of the counter connector 5 reaches the engagement balls 9, they are forced into the annular groove 23 by the wave spring 14 via the engagement ball operating part 11.

The engagement of the engagement balls 9 with the proximal side of the annular groove 23 locks the connector 1 to the counter connector 5. In particular, when the connector 1 and the counter connector 5 are pulled away from each other (for example by an external force or by pre-stressing element inside the connector 1 and/or the counter connector 5), the engagement balls 9 are clamped between the proximal side of the annular groove 23, which acts as an engagement part 24 of the counter connector 5, and the surface of the supporting part 8 of the connector 1. The engagement part 24 of the counter connector 5, and the surface of the supporting part 8 of the connector are formed and arranged in such a way that the force applied to the engagement balls 9 by the engagement part 24 of the counter connector is the opposite of the force applied to the engagement balls 9 by the surface of the supporting part 8. Accordingly, there is no resulting force acting on the engagement balls 9 that could move the engagement balls 9 out of their engagement positions. This can only be achieved by the engagement ball operating part 11. Consequently, the connector is particularly resistant to vibration and shock and suitable for be pre-stressed connectors.

In order to unlock and detach the connector 1 from the counter connector 5, the operator pulls the outer housing 16 of the connector 1 in the proximal direction. As a result, the outer housing 16 is slid from its distal position into its proximal position. By means of the catch 19 and the engagement ball operating part's 11 counter catch, it moves the engagement ball operating part 11 with it. As the engagement balls operating part 11 is moved from its distal position towards its proximal position, the engagement balls 9 become increasingly free to move radially in the outside direction away from the apertures. Eventually, they disengage from the engagement part 24 of the counter connector 5, thereby unlocking the connector 1 from the counter connector 5. As the connector 1 detaches from the counter connector 5, the force of the wave spring 14 returns the engagement ball operating means 11 into its distal position and with it the entire connector 1 in its resting configuration.

The features as described in the above description, claims and figures can be relevant individually or in any combination to realise the various embodiments of the invention.

The invention claimed is:

1. A connector, comprising:
   an engagement ball operating part; and
   at least one engagement ball that is movable between an engagement position and a disengagement position, wherein a motion of the engagement ball operating part of the connector to an inner housing of the connector forces the at least one engagement ball from the engagement position into the disengagement position,
wherein the at least one engagement ball is biased in the engagement position by an elastic element via the engagement ball operating part, and
wherein the connector further comprises an outer housing of the connector with a catch that when the outer housing is operated engages with a counter catch of the engagement ball operating part to move the engagement ball operating part, so that the engagement ball operating part forces the at least one engagement ball from the engagement position into the disengagement position.

2. The connector of claim 1, wherein the outer housing of the connector is movable relative to the inner housing of the connector in a longitudinal direction of the connector, wherein the outer housing is operatively connected with the engagement ball operating part such that when the outer housing is moved relative to the inner housing, the engagement ball operating part is moved to force the at least one engagement ball from the engagement position into the disengagement position.

3. The connector of claim 1, wherein motion of the engagement ball operating part is in a longitudinal direction of the connector.

4. The connector of claim 1, wherein when the at least one engagement ball is in the engagement position, it extends into a space which is suitable for an engagement part of a counter connector to be located to engage with the at least one engagement ball in order to secure the connector to the counter connector.

5. The connector of claim 1, wherein a movement of the at least one engagement ball between the engagement position and the disengagement position has a component in a radial direction of the connector.

6. The connector of claim 1, wherein in the engagement position the at least one engagement ball rests on a surface of a at least one supporting part, wherein the surface is tapered along an extension in a longitudinal direction of the connector.

7. The connector of claim 1, wherein the catch of the outer housing and the counter catch of the engagement ball operating part are shaped and arranged in a way that when the engagement ball operating part is moved from its position in which the at least one engagement ball is in its engagement position to its position in which the at least one engagement ball is in its disengagement position, this motion of the engagement ball operating part is not translated into motion of the outer housing.

8. The connector of claim 1 wherein the at least one engagement ball comprises at least two engagement balls.

9. A system, comprising:
a connector according to claim 1, and
a counter connector that is lockable to the connector by the at least one engagement ball of the connector that engages with an engagement part of the counter connector.

10. The system according to claim 9,
wherein when the connector is locked to the counter connector, at least one supporting part of the connector holds the at least one engagement ball in a locking position against forces applied to the engagement ball by the counter connector,
wherein a channel is positioned between the at least one supporting part of the connector and the engagement part of the counter connector, and
wherein the engagement ball operating part of the connector forces the at least one engagement ball along the channel from the engagement position into the disengagement position.

11. A method of unlocking a connector from a counter connector, comprising:
moving an engagement ball of the connector from an locking position, in which the engagement ball is engaged with an engagement part of the counter connector to lock the connector to the counter connector, to an unlocking position, in which the engagement ball is no longer engaged with the engagement part of the counter connector,
wherein the at least one engagement ball is biased in the engagement position by an elastic element via the engagement ball operating part, and
wherein an outer housing of the connector moves relative to an inner housing, a catch of the outer housing engages with a counter catch of the engagement ball operating part, the outer housing moves an engagement ball operating part, and the engagement ball operating part forces the engagement ball from the locking position into the unlocking position.

* * * * *